United States Patent
Stolbikov et al.

(10) Patent No.: US 11,621,846 B2
(45) Date of Patent: Apr. 4, 2023

(54) PRIVACY PROTECTING TRANSPARENCY TREE FOR DEVICE ATTESTATION

(71) Applicant: Lenovo (Singapore) Pte. Ltd., Singapore (SG)

(72) Inventors: Igor Stolbikov, Apex, NC (US); Rod D Waltermann, Rougemont, NC (US); Scott Wentao Li, Cary, NC (US); Ratan Ray, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/212,931

(22) Filed: Mar. 25, 2021

(65) Prior Publication Data

US 2022/0311614 A1  Sep. 29, 2022

(51) Int. Cl.
*H04L 9/32* (2006.01)
*H04L 9/08* (2006.01)
*G06F 16/901* (2019.01)

(52) U.S. Cl.
CPC ........ *H04L 9/3218* (2013.01); *G06F 16/9027* (2019.01); *H04L 9/0825* (2013.01)

(58) Field of Classification Search
CPC ....... H04L 9/3218; H04L 9/0825; H04L 9/32; H04L 9/08; G06F 16/9027; G06F 16/901
See application file for complete search history.

(56) References Cited

U.S. PATENT DOCUMENTS

| | | | |
|---|---|---|---|
| 2017/0093906 A1* | 3/2017 | Bhargav-Spantzel | ................ H04L 9/3218 |
| 2019/0244290 A1* | 8/2019 | Massacci | ................ G06Q 40/04 |
| 2022/0141041 A1* | 5/2022 | Parikh | ................ H04L 9/3066 713/156 |

* cited by examiner

Primary Examiner — Quazi Farooqui
(74) Attorney, Agent, or Firm — Schwegman Lundberg & Woessner, P.A.

(57) ABSTRACT

A system includes a binary tree having leaf hashes. The leaf hashes include a device privacy protected index and a set of zero-knowledge commitments relating to a computer device. The system calculates the device privacy protected index using a verifiable random function such that a device entity path in the binary tree cannot reveal any information about any other device in the binary tree, and associates the set of zero-knowledge commitments with the device privacy protected index. The system then generates a privacy-protected attestation for the computer device using the device privacy protected index and the set of zero-knowledge commitments.

16 Claims, 4 Drawing Sheets

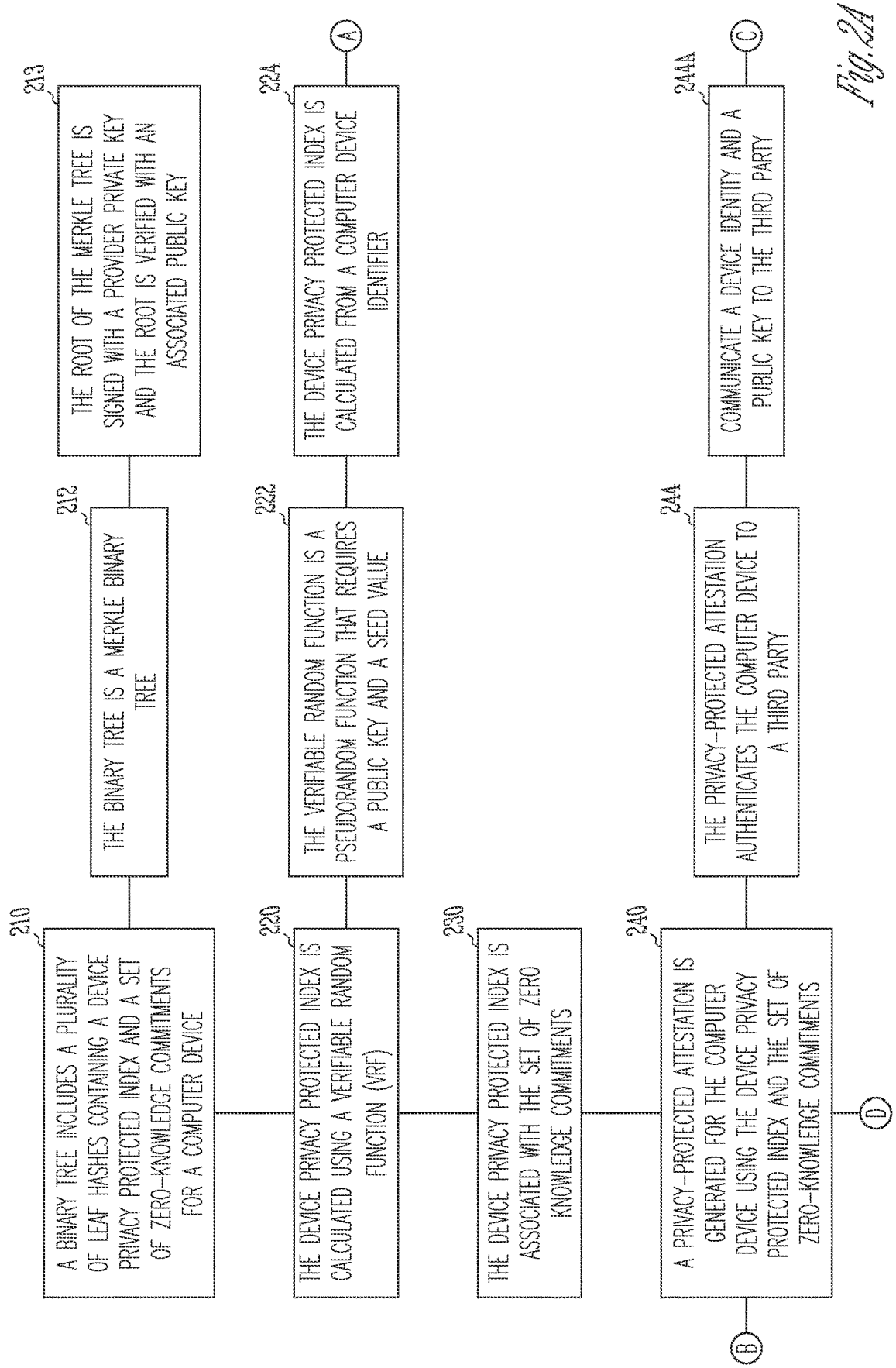

PRIVACY PROTECTING TRANSPARENCY TREE FOR DEVICE ATTESTATION

BACKGROUND

Device management services in general lack an ability to provide privacy protected attestation for computer devices. Such attestation should provide to a device owner non-refutable proofs of the device credentials, device attributes, manufacturing attestations, performance characteristics, and warranty information. Such proofs are normally expected by consumers so that the consumers can be sure that the devices that they have purchased match the declared specifications and do not contain any malleable components that may make the devices unusable by the consumer. Such malleable components may include counterfeit electronic components and parts, unauthorized software, and unauthorized firmware. Moreover, manufacturers of computer devices and components may be legally obligated to show that their devices as a whole meet production specifications, such as batteries that meet certain capacities and that operate within certain temperature values.

Prior attempts to implement such attestation systems include a centralized database combined with a web-based server that collects parameters of the manufactured devices. In such systems, if one knows the serial number of the manufactured device, one can look up the specifications of the manufactured device. However, such database systems lack critical properties related to non-refuting, immutability, and transparency. Specifically, the data in the database can be manipulated, and such systems do not provide any non-refutable proofs. Such systems also suffer from weak security that make them susceptible to attack, unreliable, and error prone.

Other prior attestation systems have attempted to use block chain technology. Blockchain technology improves on the immutability and non-refutability of such systems, but such systems still lack privacy protection because of the public nature of blockchains.

SUMMARY

A computer-based process includes receiving into a computer processor a binary tree having a plurality of leaf hashes, the leaf hashes including a device privacy protected index and a set of zero-knowledge commitments relating to a computer device. The calculation of the device privacy protected index includes using a verifiable random function such that a device entity path in the binary tree cannot reveal any information about any other device in the binary tree. The process then associates the set of zero-knowledge commitments with the device privacy protected index, and generates a privacy-protected attestation for the computer device using the device privacy protected index and the set of zero-knowledge commitments.

A computer-readable medium includes instructions that when executed by a processor execute a process that receives into a computer processor a binary tree including a plurality of leaf hashes, the leaf hashes including a device privacy protected index and a set of zero-knowledge commitments relating to a computer device. Execution of the instructions calculate the device privacy protected index using a verifiable random function such that a device entity path in the binary tree cannot reveal any information about any other device in the binary tree. The instructions then associate the set of zero-knowledge commitments with the device privacy protected index, and generate a privacy-protected attestation for the computer device using the device privacy protected index and the set of zero-knowledge commitments.

A computer system includes a computer processor and a computer memory coupled to the computer processor. The computer processor is operable for receiving a binary tree having a plurality of leaf hashes, the leaf hashes including a device privacy protected index and a set of zero-knowledge commitments relating to a computer device. The computer processor further calculates the device privacy protected index using a verifiable random function such that a device entity path in the binary tree cannot reveal any information about any other device in the binary tree and associates the set of zero-knowledge commitments with the device privacy protected index. The computer processor then generates a privacy-protected attestation for the computer device using the device privacy protected index and the set of zero-knowledge commitments.

BRIEF DESCRIPTION OF THE DRAWINGS

FIGS. 2A and 2B are a block diagram illustrating an example of a system and method for device attestation.

DETAILED DESCRIPTION

Figure 1:
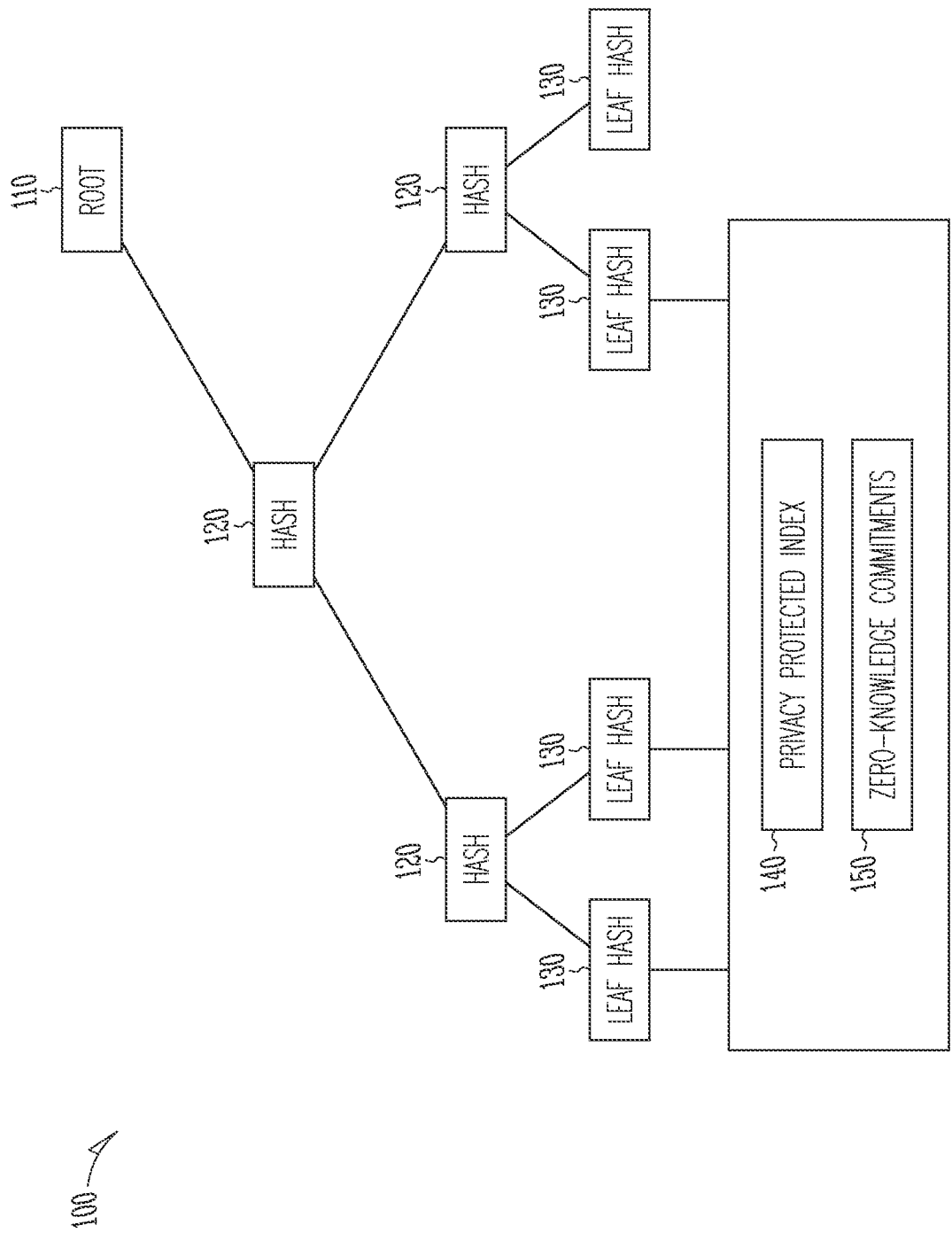
FIG. 1 illustrates an example of a Merkel binary tree that can be used in connection with device attestation.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of hardware-based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system. The article "a" or "an" means "one or more" unless explicitly limited to a single one.

The present disclosure uses a transparency tree, which combines several recent innovations in the crypto-technology field to achieve tamper-evident and publicly auditable global device directories. In an embodiment, a verifiable signed Merkle tree is used. Using the signed Merkel tree, consumers can quickly and efficiently identify device identity and device manufacturing attributes without any risk of tampering. The embodiment also permits one to establish device to device communications, or device to third party service communications, with attestation of the device identity and proof that it is the device it claims to be, without revealing any internal information relating to the device. In short, an embodiment provides the ability to have ephemeral device ids and device public keys, issued for specific communications, with attestation using the device transparency tree.

More particularly, in an embodiment, a verifiable map and/or sparse Merkle tree and/or transparency tree is used. These transparency trees can be constructed as Merkle binary prefix trees. The transparency trees provide a lookup service for generic records and a public, tamper-proof audit log of all record changes. And, while the audit log is publicly available, individual records are only revealed in response to queries for specific ids (such as device serial numbers). Key transparency can be used as a public key discovery service to identify and/or authenticate the devices and provide a mechanism to assure transparency.

An example of such a Merkle tree 100 is illustrated in FIG. 1. The tree consists of a hash root 110, intermediate hashes 120, and leaf hashes 130. The root of the tree is signed with the provider private key and can be verified with the public key. The leaf hashes 130 contain a device privacy protected index 140 and a set of zero-knowledge commitments 150. The leaf hashes (or leaf nodes) 130 represent exactly one complete index for a particular device. The device privacy protected index is calculated from an ephemeral device identifier or a regular device identifier. An ephemeral device identifier, as is known to those of skill in the art, are tokens exchanged by clients during an encounter to uniquely identify themselves. An example of a regular device identifier is a serial number. As known to those of skill in the art, in cryptography, a zero-knowledge proof or zero-knowledge protocol is a method by which one party (the prover) can prove to another party (the verifier) that they know something, like a particular value x, without conveying any information apart from the fact that they know the particular value x. The zero-knowledge commitments in an embodiment of this disclosure can include a commitment to such things as knowledge of a public key and knowledge of device attributes.

The device privacy protected index is calculated for a device and/or device component. The device privacy protected index ensures that each device entity path in the binary tree reveals no other information about other devices that are stored in the tree. This is in contrast to a situation wherein indices would be computed with any publicly available and computable function of the device (such as a simple hash of the device serial number and model number), wherein each device's identity path would reveal information about the presence of other devices with identifications that are "close" to that device. For example, a hacker could hash a large number of potential serial numbers in an offline environment, and search for potential serial numbers whose index shares the prefix i, wherein i=H(VRF(device id)). To prevent such leakage, these device privacy protected indices are calculated using the just noted verifiable random function (VRF), a pseudorandom function that requires a private key to compute, that is, predictable public/private key signing is used. The VRF permits a person who knows the public key and a seed value to find a derived index value. Without knowledge of these values, it is impossible to determine the value of the index, thereby preserving the privacy in the system. While this computation can be verified with a short proof, without the proof the result is indistinguishable from a simple random function. In short, the verifiable random function generates the index for a device id, which instills the privacy feature in the Merkle tree.

Then, to ensure that it is not possible to test if a device's key data (that is, the device privacy protected index) are equal to some known value, given the user's calculated lookup device privacy protected index, a zero-knowledge cryptographic commitment to each device's data is stored with the device privacy protected index, rather than with the data themselves. The zero-knowledge commitment can include a device identifier, a device public key, a solution id, and/or a device attribute. The commitment is a cryptographic primitive. Two particular commitments are a zero-knowledge commitment using the device identifier, solution id, and a public key, and a zero-knowledge commitment using device attributes.

In an embodiment, a commitment to a message M is referred to as hiding, which means the commitment does not reveal M. The commitment is also binding, which means that if a commitment is made to M, if cannot be opened to a different message M'. In the context of bulletproofs, commitment refers to a Pedersen commitment, which has the additional property of being additively homomorphic, which means that commitments to A and B are equal to a commitment to C only if A plus B are equal to C.

As noted above, a zero-knowledge proof is a proof that a certain statement is true, without revealing what the statement is about. This is normally done by making a commitment to the statement, and then sharing the statement along with the proof. Similarly, a zero-knowledge range proof is a proof that a secret value is in a certain range (from 0 to $2^n-1$). The proof is usually shared with a commitment to the secret value so that it can be verified.

As noted above, an embodiment is based on zero-knowledge commitments. There are three cryptographic algorithms that have the necessary characteristics—ZK-SNARK proofs (Zero-knowledge Succinct Non-Interactive Argument of Knowledge), ZK-STARK proofs (Zero-Knowledge Transparent Scalable Arguments of Knowledge), and bullet proofs and bullet ranges.

Three example implementations of such device attestation are as follows. First, the device can be authenticated to or for a third-party service. In such an instance, the device would request an ephemeral id and public key to communicate with this third-party service. The service would verify this request through zero-knowledge commitments from the Device Attestation Tree service. Thereafter, the zero-knowledge attributes would be sent to the third-party service matching to the values provided by the device. One example of such attributes is a public key for the communications. The third-party service will be able to validate the validity of the public key through the Device Attestation Tree service. Such an approach has strong privacy and security benefits as the device ID and public key are ephemeral and can be valid for a short period of time. Similarly, a first device can identify or authenticate itself to another second device. Also, a device may want to verify its own attributes, and as before the zero-knowledge commitments can be used for such verifications.

Figure 2B:
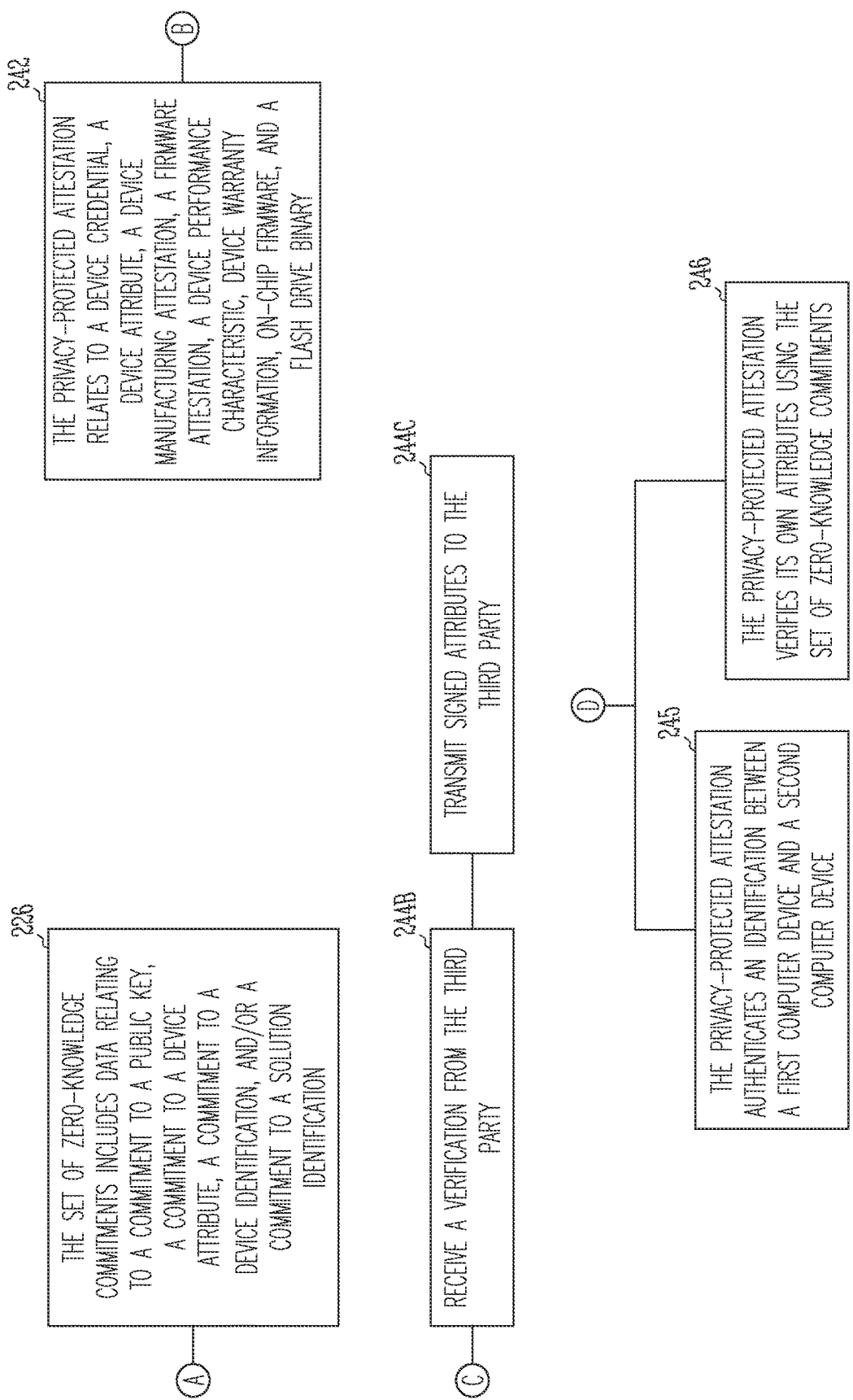

FIGS. 2A and 2B illustrate operations and features of an embodiment of a privacy protecting transparency tree for device attestation. FIGS. 2A and 2B include operation or feature blocks 210-246. Though arranged substantially serially in the example of FIGS. 2A and 2B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIGS. 2A and 2B, at 210, a binary tree including a plurality of leaf hashes is received. The leaf hashes contain a device privacy protected index and a set of zero-knowledge commitments relating to a computer device. As indicated at 212, in an embodiment, the binary tree is a Merkle binary tree. As indicated at 213, in an embodiment, the root of the Merkle tree is signed with a provider private key and the root is verified with an associated public key.

At 220, the device privacy protected index is calculated using a verifiable random function (VRF). The use of a verifiable random function assures that a device entity path in the binary tree cannot reveal any information about any other device in the binary tree. This instills a level of privacy in the system. The verifiable random function can be a pseudorandom function that requires a public key and a seed value (222). As indicated at 224, the device privacy protected index is calculated from a computer device identifier, such as a serial number. As indicated at 226, the set of zero-knowledge commitments can include data relating to a commitment to a public key, a commitment to a device attribute, a commitment to a device identification, and/or a commitment to a solution identification.

At 230, the device privacy protected index is associated with the set of zero-knowledge commitments.

At 240, a privacy-protected attestation is generated for the computer device using the device privacy protected index and the set of zero-knowledge commitments. As noted at 242, the privacy-protected attestation can relate to a device credential, a device attribute, a device manufacturing attestation, a firmware attestation, a device performance characteristic, device warranty information, on-chip firmware, and a flash drive binary. For example, the privacy-protected attestation can attest that the device has at least 100 megabytes of memory.

At 244, the privacy-protected attestation authenticates the computer device to a third party. This third-party authentication involves communicating a device identity and a public key to the third party (244A), receiving a verification from the third party (244B), and transmitting signed attributes to the third party (244C). In a similar manner, at 245, the privacy-protected attestation authenticates an identification between a first computer device and a second computer device, and at 246, the privacy-protected attestation verifies its own attributes using the set of zero-knowledge commitments.

Figure 3:
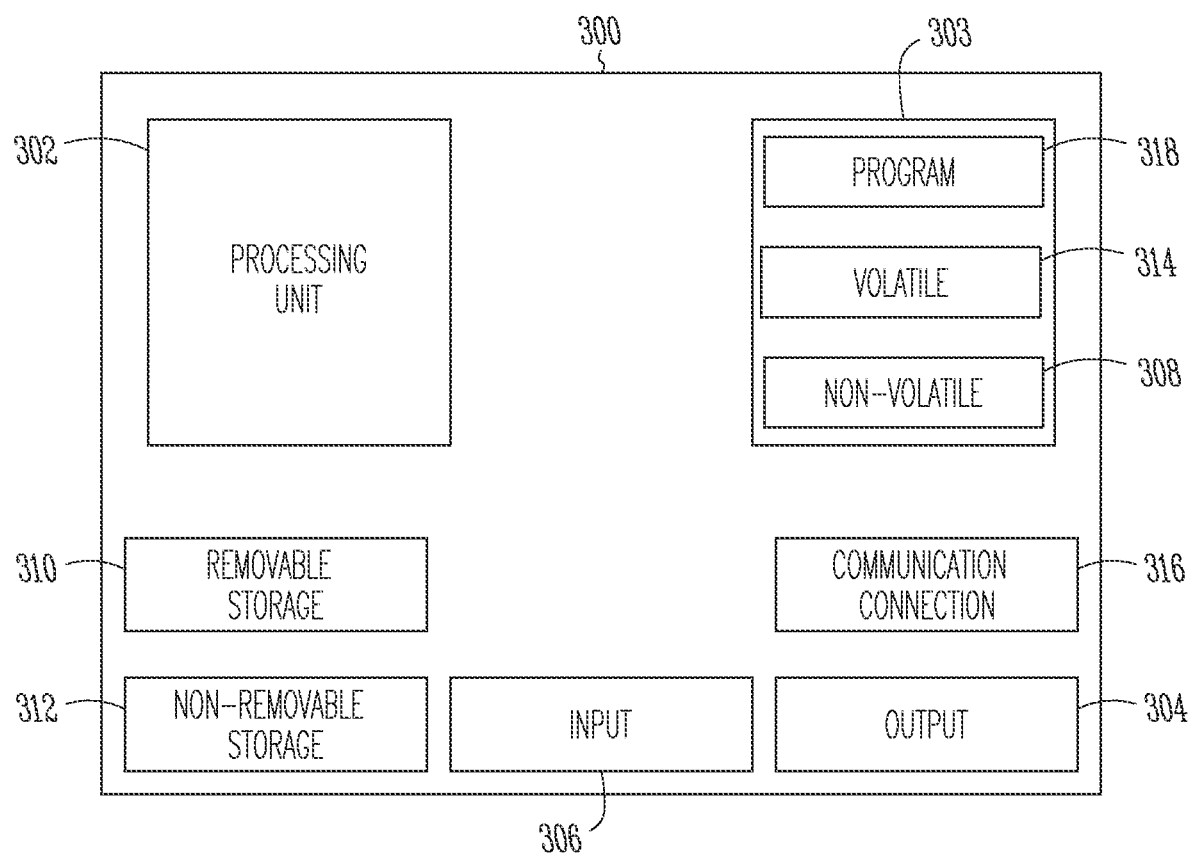
FIG. 3 is a block diagram of computer system used to implement methods of device attestation according to an example embodiment.

FIG. 3 is a block schematic diagram of a computer, 300 to implement computing resources according to example embodiments. All components need not be used in various embodiments. One example computing device in the form of a computer 300, may include a processing unit 302, memory 303, removable storage 310, and non-removable storage 312. Sensors may be coupled to provide data to the processing unit 302. Memory 303 may include volatile memory 314 and non-volatile memory 308. Computer 300 may include—or have access to a computing environment that includes—a variety of computer-readable media, such as volatile memory 314 and non-volatile memory 308, removable storage 310 and non-removable storage 312. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 300 may include or have access to a computing environment that includes input 306, output 304, and a communication connection 316. Output 304 may include a display device, such as a touchscreen, that also may serve as an input device. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 302 of the computer 300. A hard drive, CD-ROM, DRAM, and RAM are some examples of data storage devices including a non-transitory computer-readable medium. For example, a computer program 318 may be used to cause processing unit 302 to perform one or more methods or algorithms described herein. Computer program 318 may be stored on a device or may be downloaded from a server to a device over a network such as the Internet. Computer-readable instructions may also be included on a computer readable storage medium that is being vended and/or provided, where the computer readable storage medium is defined as not encompassing a transitory signal, carrier wave, and/or a signal per se.

EXAMPLES

Example 1 is a computerized process including receiving into a computer processor a binary tree comprising a plurality of leaf hashes, the leaf hashes comprising a device privacy protected index and a set of zero-knowledge commitments relating to a computer device; calculating the device privacy protected index using a verifiable random function such that a device entity path in the binary tree cannot reveal any information about any other device in the binary tree; associating the set of zero-knowledge commitments with the device privacy protected index; and generating a privacy-protected attestation for the computer device using the device privacy protected index and the set of zero-knowledge commitments.

Example 2 includes the features of claim 1, and optionally includes the feature wherein the binary tree comprises a Merkle binary tree.

Example 3 includes the features of Examples 1-2, and optionally includes the feature wherein the privacy-protected attestation comprises data relating to one or more of a device credential, a device attribute, a device manufacture, device firmware, a device performance characteristic, device warranty information, on-chip firmware, and a flash drive binary.

Example 4 includes the features of Examples 1-3, and optionally includes the feature of calculating the device privacy protected index from a computer device identifier.

Example 5 includes the features of Examples 1-4, and optionally includes the features wherein the set of zero-knowledge commitments comprises data relating to one or more of a commitment to a public key, a commitment to a device attribute, a commitment to a device identification, and a commitment to a solution identification.

Example 6 includes the features of Examples 1-5, and optionally includes the features wherein the privacy-protected attestation comprises authenticating the computer device to a third party, the authenticating comprising communicating a device identity and a public key to the third party; receiving a verification from the third party; and transmitting signed attributes to the third party.

Example 7 includes the features of Examples 1-6, and optionally includes the feature wherein the privacy-protected attestation comprises an authentication or an identification between a first computer device and a second computer device.

Example 8 includes the features of Examples 1-7, and optionally includes the feature wherein the privacy-protected attestation comprises a computer device verifying its own attributes using the set of zero-knowledge commitments.

Example 9 includes the features of Examples 1-8, and optionally includes the feature wherein a root of the Merkle tree is signed with a provider private key and the root is verified with an associated public key.

Example 10 includes the features of Examples 1-9, and optionally includes the feature wherein the verifiable random function comprises a pseudorandom function that requires a public key and a seed value.

Example 11 is a computer-readable medium comprising instructions that when executed by a processor execute a process comprising receiving into a computer processor a binary tree comprising a plurality of leaf hashes, the leaf hashes comprising a device privacy protected index and a set of zero-knowledge commitments relating to a computer device; calculating the device privacy protected index using a verifiable random function such that a device entity path in the binary tree cannot reveal any information about any other device in the binary tree; associating the set of zero-knowledge commitments with the device privacy protected index; and generating a privacy-protected attestation for the computer device using the device privacy protected index and the set of zero-knowledge commitments.

Example 12 includes the features of Example 11, and optionally includes the feature wherein the binary tree comprises a Merkle binary tree.

Example 13 includes the features of Examples 11-12, and optionally includes the features wherein the privacy-protected attestation comprises data relating to one or more of a device credential, a device attribute, a device manufacture, firmware, a device performance characteristic, device warranty information, on-chip firmware, and a flash drive binary; and wherein the set of zero-knowledge commitments comprises data relating to one or more of a commitment to a public key, a commitment to a device attribute, a commitment to a device identification, and a commitment to a solution identification.

Example 14 includes the features of Examples 11-13, and optionally includes the features of comprising instructions for calculating the device privacy protected index from a computer device identifier.

Example 15 includes the features of Examples 11-14, and optionally includes the feature wherein the privacy-protected attestation comprises instructions for authenticating the computer device to a third party, and the authenticating comprises communicating a device identity and a public key to the third party; receiving a verification from the third party; and transmitting signed attributes to the third party.

Example 16 includes the features of Examples 11-15, and optionally includes the feature wherein the privacy-protected attestation comprises an authentication or identification between a first computer device and a second computer device.

Example 17 includes the features of Examples 11-16, and optionally includes the feature wherein the privacy-protected attestation comprises a computer device verifying its own attributes using the set of zero-knowledge commitments.

Example 18 includes the features of Examples 11-17, and optionally includes the feature wherein a root of the Merkle tree is signed with a provider private key and the root is verified with an associated public key.

Example 19 includes the features of Examples 11-18, and optionally includes the feature wherein the verifiable random function comprises a pseudorandom function that requires a public key and a seed value.

Example 20 is a system comprising a computer processor; and a computer memory coupled to the computer processor; wherein the computer processor is operatable for: receiving into a computer processor a binary tree comprising a plurality of leaf hashes, the leaf hashes comprising a device privacy protected index and a set of zero-knowledge commitments relating to a computer device; calculating the device privacy protected index using a verifiable random function such that a device entity path in the binary tree cannot reveal any information about any other device in the binary tree; associating the set of zero-knowledge commitments with the device privacy protected index; and generating a privacy-protected attestation for the computer device using the device privacy protected index and the set of zero-knowledge commitments.

The invention claimed is:

1. A computerized process comprising:
receiving into a computer processor a binary tree comprising a plurality of leaf hashes, the leaf hashes comprising a device privacy protected index and a set of zero-knowledge commitments relating to a computer device;
calculating the device privacy protected index using a verifiable random function such that a device entity path in the binary tree cannot reveal any information about any other device in the binary tree;
associating the set of zero-knowledge commitments with the device privacy protected index; and
generating a privacy-protected attestation for the computer device using the device privacy protected index and the set of zero-knowledge commitments;
wherein the binary tree comprises a Merkle binary tree; and
wherein a root of the Merkle tree is signed with a provider private key and the root is verified with an associated public key.

2. The process of claim 1, wherein the privacy-protected attestation comprises data relating to one or more of a device credential, a device attribute, a device manufacture, device firmware, a device performance characteristic, device warranty information, on-chip firmware, and a flash drive binary.

3. The process of claim 1, comprising calculating the device privacy protected index from a computer device identifier.

4. The process of claim 1, wherein the set of zero-knowledge commitments comprises data relating to one or more of a commitment to a public key, a commitment to a device attribute, a commitment to a device identification, and a commitment to a solution identification.

5. The process of claim 1, wherein the privacy-protected attestation comprises authenticating the computer device to a third party, the authenticating comprising:
- communicating a device identity and a public key to the third party;
- receiving a verification from the third party; and
- transmitting signed attributes to the third party.

6. The process of claim 1, wherein the privacy-protected attestation comprises an authentication or an identification between a first computer device and a second computer device.

7. The process of claim 1, wherein the privacy-protected attestation comprises a computer device verifying its own attributes using the set of zero-knowledge commitments.

8. The process of claim 1, wherein the verifiable random function comprises a pseudorandom function that requires a public key and a seed value.

9. A non-transitory computer-readable medium comprising instructions that when executed by a processor execute a process comprising:
- receiving into a computer processor a binary tree comprising a plurality of leaf hashes, the leaf hashes comprising a device privacy protected index and a set of zero-knowledge commitments relating to a computer device;
- calculating the device privacy protected index using a verifiable random function such that a device entity path in the binary tree cannot reveal any information about any other device in the binary tree;
- associating the set of zero-knowledge commitments with the device privacy protected index; and
- generating a privacy-protected attestation for the computer device using the device privacy protected index and the set of zero-knowledge commitments;
- wherein the binary tree comprises a Merkle binary tree; and
- wherein a root of the Merkle tree is signed with a provider private key and the root is verified with an associated public key.

10. The non-transitory computer-readable medium of claim 9, wherein the privacy-protected attestation comprises data relating to one or more of a device credential, a device attribute, a device manufacture, firmware, a device performance characteristic, device warranty information, on-chip firmware, and a flash drive binary; and wherein the set of zero-knowledge commitments comprises data relating to one or more of a commitment to a public key, a commitment to a device attribute, a commitment to a device identification, and a commitment to a solution identification.

11. The non-transitory computer-readable medium of claim 9, comprising instructions for calculating the device privacy protected index from a computer device identifier.

12. The non-transitory computer-readable medium of claim 9, wherein the privacy-protected attestation comprises instructions for authenticating the computer device to a third party, and the authenticating comprises:
- communicating a device identity and a public key to the third party;
- receiving a verification from the third party; and
- transmitting signed attributes to the third party.

13. The non-transitory computer-readable medium of claim 9, wherein the privacy-protected attestation comprises an authentication or identification between a first computer device and a second computer device.

14. The non-transitory computer-readable medium of claim 9, wherein the privacy-protected attestation comprises a computer device verifying its own attributes using the set of zero-knowledge commitments.

15. The non-transitory computer-readable medium of claim 9, wherein the verifiable random function comprises a pseudorandom function that requires a public key and a seed value.

16. A system comprising:
- a computer processor; and
- a computer memory coupled to the computer processor;
- wherein the computer processor is operatable for:
  - receiving into a computer processor a binary tree comprising a plurality of leaf hashes, the leaf hashes comprising a device privacy protected index and a set of zero-knowledge commitments relating to a computer device;
  - calculating the device privacy protected index using a verifiable random function such that a device entity path in the binary tree cannot reveal any information about any other device in the binary tree;
  - associating the set of zero-knowledge commitments with the device privacy protected index; and
  - generating a privacy-protected attestation for the computer device using the device privacy protected index and the set of zero-knowledge commitments;
  - wherein the binary tree comprises a Merkle binary tree; and
  - wherein a root of the Merkle tree is signed with a provider private key and the root is verified with an associated public key.

* * * * *